(12) United States Patent
Harpaz

(10) Patent No.: US 7,147,473 B2
(45) Date of Patent: Dec. 12, 2006

(54) HAND-WRITING PRACTICING SYSTEM

(76) Inventor: Yehouda Harpaz, 129 Corrie Road, Cambridge, Cambs (GB) CB1 3QQ ( * ) Notice: Subject to any disclaimer, the term of this patent is extended or adjusted under 35 U.S.C. 154(b) by 268 days.

(21) Appl. No.: 10/497,139

(22) PCT Filed: Mar. 31, 2003

(86) PCT No.: PCT/GB03/01407

§ 371 (c)(1),
(2), (4) Date: May 28, 2004

(87) PCT Pub. No.: WO03/094132

PCT Pub. Date: Nov. 13, 2003

(65) Prior Publication Data

US 2005/0064373 A1    Mar. 24, 2005

(30) Foreign Application Priority Data

May 3, 2002    (GB) ................... 0210178.0

(51) Int. Cl.
*G09B 11/00*    (2006.01)

(52) U.S. Cl. .................. 434/162; 434/88; 434/165; 345/179

(58) Field of Classification Search .......... 434/81, 434/84–88, 98, 100, 165, 307 R, 308, 317, 434/365, 162, 163; 345/179; 382/161, 185, 382/187

See application file for complete search history.

(56) References Cited

U.S. PATENT DOCUMENTS

| 5,191,622 | A | * | 3/1993 | Shojima et al. ............. 382/185 |
| 5,267,327 | A | * | 11/1993 | Hirayama ................... 382/161 |
| 5,434,929 | A | * | 7/1995 | Beernink et al. ........... 382/187 |
| 5,513,991 | A | | 5/1996 | Reynolds et al. |
| 5,956,021 | A | * | 9/1999 | Kubota et al. ............... 345/179 |
| 6,238,217 | B1 | * | 5/2001 | Mirando et al. ............. 434/365 |
| 6,572,378 | B1 | * | 6/2003 | Rehkemper et al. .......... 434/85 |
| 2001/0038999 | A1 | | 11/2001 | Hainey, II |
| 2002/0167497 | A1 | * | 11/2002 | Hoekstra et al. ............ 345/179 |

FOREIGN PATENT DOCUMENTS

| JP | 2000123115 A | * | 4/2000 |
| WO | WO 98 32107 A | | 7/1998 |
| WO | WO 00 72290 A1 | | 11/2000 |

* cited by examiner

*Primary Examiner*—Joe H. Cheng

(57) ABSTRACT

A hand-writing practicing system is comprised of a computer with a screen that can sense the movement of a stylus on it, and software the displays to the user original script in hand-writing, record the stylus movement as user-writing and display it on top of the original script.

2 Claims, No Drawings

HAND-WRITING PRACTICING SYSTEM

This invention relates to hand-writing and to the new kinds of computers with screens on which the user can write like on paper. The invention presents a system based on such computers for a hand-writing practicing system.

Currently there start to appear in the market "write-in" computers, which in this text means a computer that has a screen on which the user can "write" using a stylus, as if writing on paper with a pen. The movements of the stylus are sensed by the screen and passed to the software, which can then manipulate them as it wishes. There are already such tablets in the market, for example the "Tablet PC"(RTM) concept from Microsoft(RTM). Some of these systems, and in the future probably most of them, come with software that can interpret hand-writing, i.e. identify letters in it.

Hand-writing is a skill that most adults have, but in a varying degree. Some people have a neat hand-writing, while others have hand-writing which is almost impossible to read. Many people can gain a lot by improving their hand-writing. This is specially true for users of a "write-in" computers, because it will mean that the computer will do less mistakes when it tries to interpret their hand-writing.

The application PCT/US98/01210 (Agent Based Curricula, Inc. 1998) introduces a system for practicing drawing of figures, based on the idea that the user is presented a figure, and then tries to retrace it. The current invention describes a similar idea, with new features that make it specially useful for practicing hand-writing and developing new styles of hand-writing both for personal use and for commercial use.

According to the current invention, the hand-writing practicing system is implemented by a software running on a "write-in" computer. The software presents to the user an original script, which is some text written in hand-writing. The user writes on top of it, and this is recorded by the software as the user-writing and is displayed as if written on top the original script. By tracking the lines of the original script, the user practices the right movements to achieve a hand-writing which is similar to the original script.

The original script is written in a good hand-writing. A hand-writing can be good according to various criteria. The most obvious criteria are that the hand-writing is readable (for humans or computers) and aesthetic, but other criteria, like being distinctive, easy to write fast or compact, are also desirable and in some cases may be as important as readability and aesthetics. To be as useful as possible, the software is accompanied by many texts, each one of them written by a good hand-writing according to one or more of the criteria. The user can then select of these texts what is the hand-writing that they want to practice, according to their idea of what "good hand-writing" means.

The texts are kept in a format that also allows specification of the locations of occurrences of characters in the text, and all the occurrences of characters in the scripts are specified in this way, so the software knows where each occurrence of a character in the original text is. Using this knowledge the software gives the user a way to perform character-specific manipulation. This includes changing the appearance of any individual occurrence of a character in the text, but more importantly, it includes changing the appearance of all the occurrences of some character inside a selected part of the text. For example, the user may change the shape of all the occurrences of 'a', or change all the uppercase letters to red.

The choice of original script is not limited to the scripts supplied with the software, and the user can use as the original script any document they like. For example, the user may write slowly and carefully some text, and then use this as the original script, thus increasing the consistency and speed of their writing, without losing their individual style. Alternatively, the user an select some script with a hand-writing they like, practice on it for a while, and then use the result as the original script. In this way they can create their hand-writing, starting from a good base. Other options include getting texts from friends, picking texts from the internet and buying from professional designers of hand-writing styles, who may be using the software to create styles of hand-writing. Such professional designers may be selling their designed hand-writing to be used with the system which is described here, but they may also be using the system to create stylish hand-writing for other purposes.

The software allows the user to manipulate them separately. This includes editing (e.g. erasing part of the text), zooming in and out, translation etc. In particular it includes changing the colour and transparency of either of them, and typically they are displayed in different colours, which makes it easier to compare them. The software also allows various other changes, like various transformations (scale, rotate, skew etc.) and expanding or contracting the drawn area.

A specific embodiment of the invention will now be described.

The embodiment is based on "Tablet PC"(RTM). The software is specially written. The software comes with many scripts written in good hand-writing.

The scripts can be kept in the standard format, where each character is some code which identifies a glyph in a font, and to use fonts which contain glyphs of hand-written characters rather than typed characters. This, however, is quite restrictive and does not allow the users to make scripts with their own hand writing, so the system uses a new kind of representation of the text. This representation is an image of the text and specification of the location and identity of each character in the text. The system has the ability to read, manipulate and produce texts which are kept in this format. Since texts that come from other software would be in the standard format, the software is also able to read standard formats files and convert them to the image plus locations format. Typically, many of the texts that come with the software are in this format, and hence can be more variable than the range that can be achieved using the standard format with fonts.

The option of character-specific manipulating is available for manipulating both the original script and the user-writing. In the case of the user-writing, this requires the software to identify characters in the user-writing. However, since the user-writing is supposed to match the original script, the system simply takes the user-writing inside the area of a character in the original script as a matching character in the user-writing. In addition, the system gives the user the option to mark part of the area of the text by enclosing it with a stylus movement around it, and then to indicate to the software that the drawing in the enclosed area is a specific character or a specific sequence of characters. In this way, the user can correct mistakes or inaccuracies that the software does in the identification of characters.

The user may decide that they want to modify the original script, because they want to practice a hand-writing which is similar to the original script, but different in some respects. Typically the change is a difference in the way one of the characters is written. To facilitate this, the software allows the user to edit the shape of a character, in a standard bitmap editing tool. Typically, the user will select an individual occurrence of the character as the starting shape and then modify it, but the software allows the user to start from scratch. Once the user specifies the new shape, the software changes all the occurrences of this character in a selected part of the script to the new shape.

The exact shape of a character may be variable between occurrences, typically depending on the characters that precede and follow it. Thus the system may give the user an option to define the shape of a character in a specific context, typically by letting the user specify a set of preceding characters and a set of following characters and the shape of the character when it preceded and followed by characters from the respective sets. Another possibility is to let the user specify the shape of sequences of characters, including the shapes of complete words.

The software allows the user to use their own user-writing as original scripts. In this case, if the user wants to use character-specific manipulations, the software needs to identify characters in the user-writing. As described above, the user can mark parts of the script and indicate to the software which character they contain, but this process is extremely time-consuming and tedious, so the software first tries to identify characters using the interface that comes with Tablet PC, and then let the user check it and correct any mistakes.

To make it easier for the user to see where they are going wrong, the software has an option to compare the user-writing and the original script. The software checks for each letter how much the user-writing diverge from the original script, and if the divergence is larger than some threshold mark the letter in some way (e.g. underlines it or changes the background around it). Some kind of weighted summation over the divergences of all the letters is used as a mark of how close the user-writing is to the original script. The software gives the user a way to adjust the weights, so the user can indicate that some letters are more important than others.

The invention claimed is:

1. A hand-writing practicing system, comprised of:

A computer equipped with a screen that can sense the movement of a stylus on it;

and a software running on the computer, which displays some existing text in hand-writing as the original script;

records stylus movements as user-writing;

displays the recorded user-writing as if written on top of the original script;

in response to appropriate input, manipulates separately the appearance of the original script and the user-writing;

in response to appropriate input, performs operations on all the occurrences of a specific character, either in the original script or user-writing, and these operations include changing the shape of all the occurrences of a character in some part of the original script or the user-writing to an arbitrary shape.

2. A system as described in claim 1, where the software can read, manipulate and produce texts which are kept as images of the text and specification of the location and identity of each occurrence of a character in the text.

* * * * *